United States Patent [19]

Egorov et al.

[11] 3,934,665

[45] Jan. 27, 1976

[54] TWO-STEP FINAL DRIVE OF A CRAWLER TRACTOR WITH RUNNING BOGIES

[76] Inventors: Jury Dmitrievich Egorov, ulitsa Marchenko 17, kv. 4; Ivan Savvateevich Kavyarov, prospekt Lenina, 15, kv. 20; Jury Petrovich Samatov, prospekt Lenina, 22, kv. 30; Nikolai Alexandrovich Chasovodov, ulitsa Marchenko, 19B, kv, 57; Jury Ivanovich Chirikhin, prospekt Lenina, 28a, kv, 95, all of Chelyabinsk, U.S.S.R.

[22] Filed: July 22, 1974

[21] Appl. No.: 490,867

Related U.S. Application Data

[63] Continuation of Ser. No. 371,691, June 20, 1973, abandoned.

[52] U.S. Cl. .................................. 180/9.62; 305/16
[51] Int. Cl.² ......................................... B62D 55/00
[58] Field of Search ...................... 180/9.62; 305/16

[56] References Cited
UNITED STATES PATENTS

| | | | |
|---|---|---|---|
| 2,059,261 | 11/1936 | Marshall | 180/9.62 X |
| 2,341,883 | 2/1944 | Sloan | 180/9.62 X |
| 2,702,603 | 2/1955 | Risk | 180/9.62 |
| 2,833,361 | 5/1958 | Schwartz | 180/9.62 X |
| 2,978,051 | 4/1961 | Risk | 180/9.62 |
| 3,096,840 | 7/1963 | Mazzarins | 180/9.62 X |

*Primary Examiner*—Philip Goodman
*Attorney, Agent, or Firm*—Holman & Stern

[57] ABSTRACT

The drive has two steps, one consisting of a pair of spur gear wheels and the other being a planetary reducer. The reducer incorporates a ring gear and a carrier, with the carrier being attached to the tractor frame. The track sprocket is supported by bearings at a free end of the carrier between a pivot of the track roller frame and the planetary reducer and is linked up with the ring gear. Fitted to the same free end of the carrier is the track roller frame.

3 Claims, 3 Drawing Figures

3,934,665

TWO-STEP FINAL DRIVE OF A CRAWLER TRACTOR WITH RUNNING BOGIES

This is a continuation of application Ser. No. 371,691, filed June 20, 1973, now abandoned.

BACKGROUND OF THE INVENTION

The present invention relates to transport and tractor engineering, and more specifically to two-step final drives of the transmission of a crawler tractor provided with track roller frames whose bearings are disposed coaxially with respect to the track sprockets.

The present invention may be used to advantage in tractors developing a tractive force of considerable magnitude in coping with heavy cyclic loads. It may also find application in transport vehicles operating under the conditions of heavy dynamic loads.

PRIOR ART

There are known two-step final drives for crawler tractors provided with track roller frames arranged so that their pivotal supports are disposed coaxially with respect to the track sprockets and the drives comprise two steps, one in the form of a pair of spur gears and the other in the form of a planetary reducer. In the final drive, the first and second steps are accommodated in a final drive housing rigidly secured to the tractor frame. The first step consists of a pinion and a large diameter gear rotatably mounted on an axle shaft rigidly attached to said tractor frame. The planetary reducer is disposed immediately adjacent the first step and comprises a ring gear rigidly secured in the final drive housing and a sun gear disposed in driving relation with a plurality of planet pinions which, in turn, mesh with the ring gear. The large diameter gear and the sun gear are each provided with integral coaxial hollow shaft portions which accommodate the axle shaft so that at its free end, there is fitted a pivot of a track roller frame with a support of composite construction.

A carrier of the drive is rotatably supported by bearings disposed in the final drive housing and accommodates a rigidly secured sprocket for transmitting the drive to a track.

This arrangement, although an advanced one, is not free from certain drawbacks. A disadvantage of the arrangement is a too large diameter of the final drive because the sun gear is of an enlarged diameter to provide give room for the axle shaft which passes therethrough and the ring gear is of a larger than normal diameter to provide for the requisite speed ratio.

Another disadvantage is the fact that the axle shaft is rigidly secured to the tractor frame and, projecting out through the final drive, forms a cantilever beam of considerable extent sustaining at its end heavy loads due to the action of a pivot of a track roller frame in transmitting a high tractive force, particularly while turning. This fact called for providing the pivot with a support of composite construction comprising a plurality of tapered roller bearings.

A further disadvantage of such arrangement is the necessity to install the drive piecemeal on the tractor with the result that its repair is substantially impaired.

OBJECTS AND SUMMARY OF THE INVENTION

It is an object of the present invention to provide a twostep final drive of a tractor which assures an extended service life.

Another object of the present invention is to provide a final drive which assures better repair.

A further object of the present invention is to provide a final drive of simplified construction.

The above and other objects are attained in that in a two-step final drive of a crawler tractor provided with track roller frames, said drive comprising a pair of spur gear wheels of which the pinion is linked up with the tractor transmission shaft and the driver gear meshes with a sun gear of a planetary reducer incorporating a carrier and a ring gear, according to the invention, said carrier is secured to a tractor frame, a track roller frame is pivotally attached to a free end of said carrier, a track sprocket is supported by bearings on the same free end of the carrier between a pivot of the track roller frame and the planetary reducer and is linked up with the ring gear. The disposition of all elements of the drive on the carrier of the planetary reducer and the fact that the drive is secured to the tractor frame through the intermediary of the same carrier have enabled the carrier to operate as the principal load-carrying component of the drive so that neither an axle shaft nor an intricate support of composite construction is required. The use of the carrier as the load-carrying component is a factor which adds to the service life of the drive, makes it compact and provides for assembling the drive as a separate unit, improving thereby the repair of the tractor.

To facilitate the fabrication of the carrier of the planetary reducer, preference is given to a split construction, comprising a carrier body statically fixed to the tractor frame and a carrier end piece secured in the body and serving the purpose of accommodating the track sprocket and one of the pivots of the track roller frame.

To facilitate the assembling of the final drive, it is preferred to link up the track sprocket with the ring gear of the planetary reducer by means of an externally-splined sleeve supported by bearings on the free end of the carrier.

The present invention will be best understood from the following detailed description of the invention when read in conjunction with the accompanying drawings in which

DETAILED DESCRIPTION OF THE INVENTION

Figure 1:
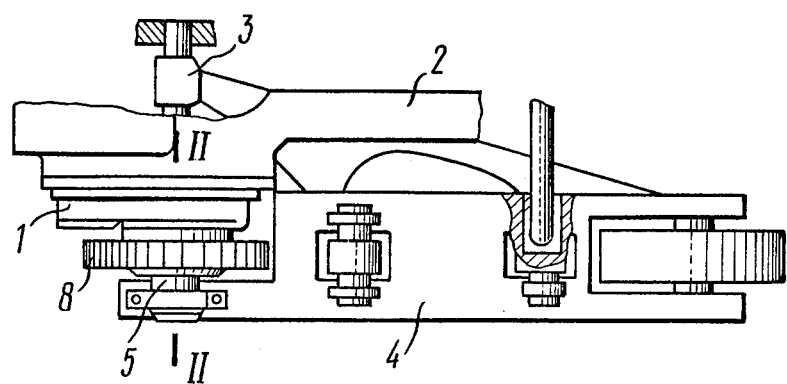
FIG. 1 is a plan view illustrating the general arrangement of the track roller frame and final drive with respect to the tractor frame.
Figure 2:
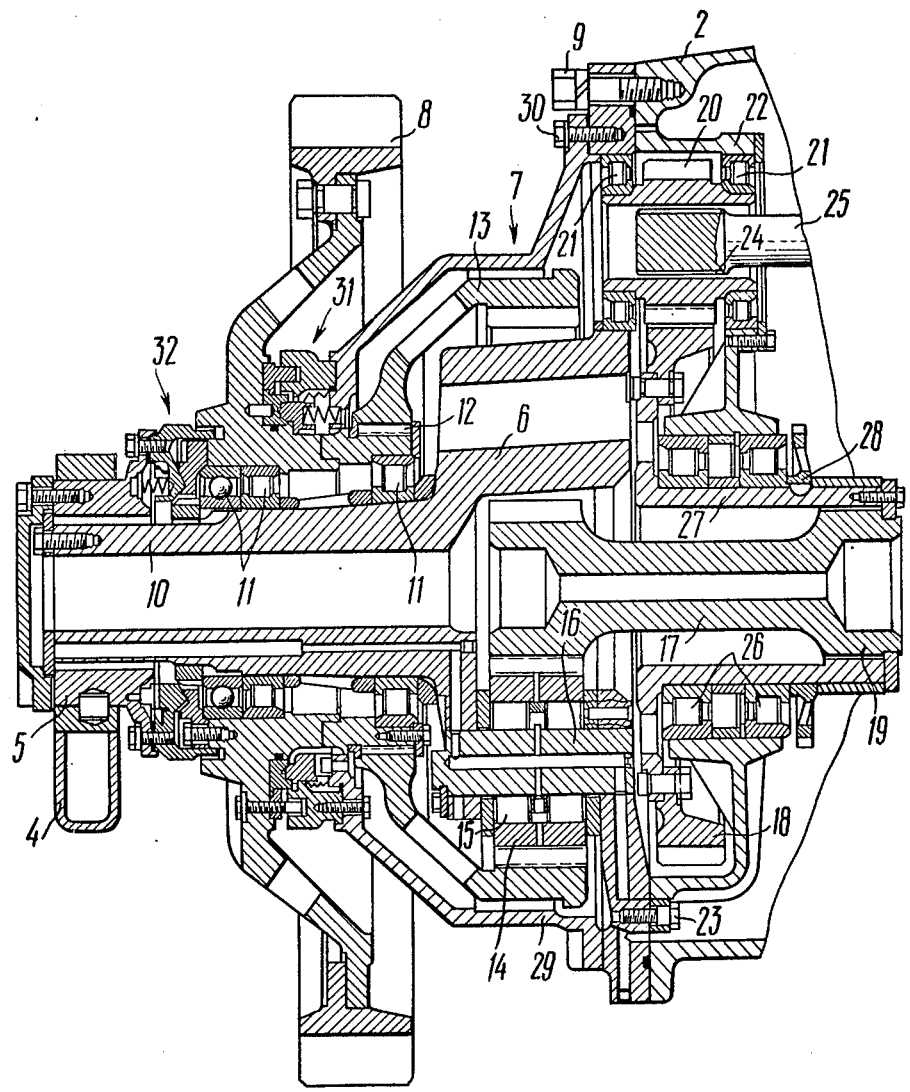
FIG. 2 is a section on line II—II of FIG. 1, the view being on an enlarged scale.

A final drive 1 (FIG. 1) is secured to a frame 2 of a tractor also accommodating a pivot 3 of a track roller frame 4 of the tractor. Another pivot 5 of the track roller frame is fitted to a carrier 6 (FIG. 2) of a planetary reducer 7. Pivotal supports of the track roller frame are disposed coaxially with respect to a sprocket 8 of the tractor.

According to the invention, the carrier 6 is attached to the frame 2 with the aid of bolts 9 and fitted to a free end 10 of the carrier is the pivot 5 of the track roller frame 4. The same free end 10 of the carrier 6 accommodates the sprocket 8 supported by bearings 11 between the pivot 5 and the planetary reducer 7. The sprocket 8 is linked up with a ring gear 13 of the planetary reducer 7 by means of splines 12. The ring gear 13 is in mesh with planet gears 14 carried by rolls 15 supported by pins 16 of the carrier 6. The planet gears in turn mesh with a sun gear 17. The sun gear is connected with a driven gear 18 of the first step by means of a splined connection 19. The driven gear 18 meshes with a pinion 20 supported by bearings 21 in a body 22 held fast to the carrier 6 by bolts 23. The pinion 20 is secured to a shaft 25 of the tractor transmission with the aid of a splined connection 24. The driven gear 18 is supported by bearings 26 in the body 22. For lubricating the components of the drive, a hub 27 of the gear 18 accommodates a drive gear 28 of an oil pump (not shown). There is a casing 29 bolted to the carrier 6 by bolts 30 and which serves as an oil reservoir. Seals 31 and 32 prevent oil leaks from the reservoir.

Figure 3:
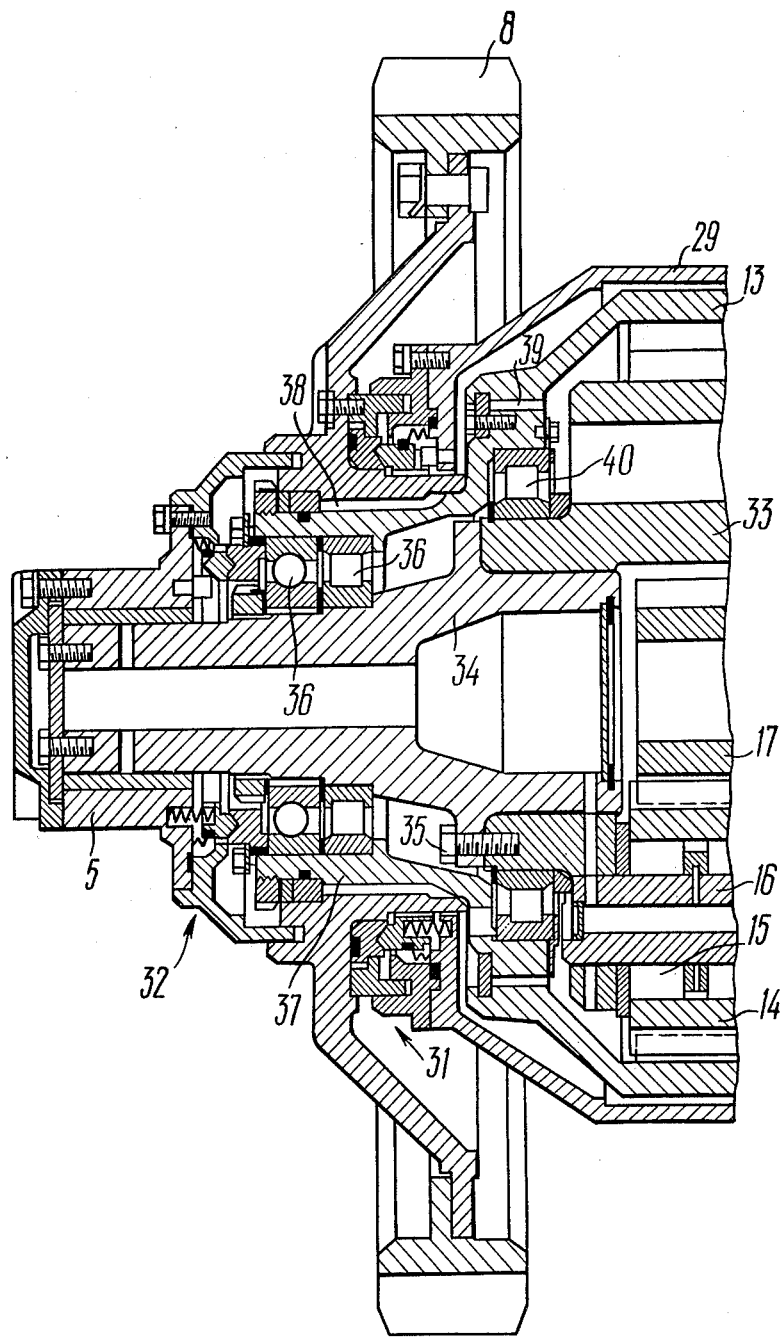
FIG. 3 is a section of another embodiment of the planetary reducer.

To facilitate the fabrication of the carrier 6, preference is given to a split construction as shown in FIG. 3. It will be noted that one part of the construction is a body 33 statically fitted to the tractor frame and the other part is an end piece 34 press-fitted into the body 33 and also held fast by bolts 35 so as to counteract the action of any possible loads, such as those due to vibration or coming into play while turning. Supported by bearings 36 on the end piece 34, there is a sleeve 37 with external splines 38 and 39. The sleeve 37 is also supported by a bearing 40 disposed in the body 33 and is linked up with the sprocket 8 and sun gear 13 through the intermediary of the splines 38 and 39, respectively. Secured to the same end piece 34 is the pivot 5 of the track roller frame.

The drive operates in the following way:

The flow of power is transmitted from the shaft 25 of the tractor transmission to the pinion 20 and thence to the driven gear 18 of the first step which, in turn, transmits power to the sun gear 17. On being subdivided into several flows whose number depends on the number of planet gears 14 provided in the drive, power is transmitted through the planet gears to the ring gear 13 and from the ring gear to the sprocket 8 either directly or via the sleeve 37 with external splines 38 and 39.

What is claimed is:

1. A two-step final drive of a crawler tractor provided with track roller frames, comprising a tractor frame; a carrier of a planetary reducer of a tractor transmission, said carrier being secured to said frame; a body disposed on one side of said carrier; a pinion supported by bearings in said body; a shaft of the tractor transmission, said shaft being linked up with said pinion through a splined connection; a driven gear supported by bearings in said body and meshing with said pinion; planet gears supported by bearings on said carrier; a sun gear meshing with said planet gears and connected to said driven gear by splines; said carrier being provided with a free end; a pivot for a track roller frame of the tractor, said pivot being disposed at said free end of the carrier; a track sprocket disposed at said free end between said pivot and the planetary reducer; and a ring gear linked up with said track sprocket by a splined connection and meshing with said planet gears.

2. The two-step final drive as claimed in claim 1 in which the carrier of the planetary reducer is of split construction, one part consisting of a body statically attached to the tractor frame and the other part being an end piece secured in said body and serving to accommodate the track sprocket and one of the track roller frame pivots.

3. The two-step drive as claimed in claim 1 in which the track sprocket is linked up with the ring gear of the planetary reducer by a sleeve provided with external splines with, said sleeve being supported by bearings on the free end of the carrier.

* * * * *